United States Patent [19]

Norton

[11] Patent Number: 5,634,020
[45] Date of Patent: May 27, 1997

[54] APPARATUS AND METHOD FOR DISPLAYING AUDIO DATA AS A DISCRETE WAVEFORM

[75] Inventor: Mark J. Norton, Bedford, Mass.

[73] Assignee: Avid Technology, Inc., Tewsbury, Mass.

[21] Appl. No.: 997,716

[22] Filed: Dec. 31, 1992

[51] Int. Cl.$^6$ ....................................... G06F 15/00
[52] U.S. Cl. ......................................... 395/339
[58] Field of Search .............. 360/13, 14.1; 395/154, 395/2.14, 2.19, 2.21, 2.23, 2.33–2.37, 2.39, 2.62, 2.74, 2.85, 2.87, 155, 157, 161; 381/40, 41, 45–48

[56] References Cited

U.S. PATENT DOCUMENTS

| | | | |
|---|---|---|---|
| 4,067,049 | 1/1978 | Kelly et al. | 360/14 |
| 4,214,278 | 7/1980 | Hunt et al. | 360/14 |
| 4,249,218 | 2/1981 | Davis et al. | 360/13 |
| 4,251,688 | 2/1981 | Furner | 381/18 |
| 4,375,083 | 2/1983 | Maxemchuk | 395/2.87 |
| 4,641,253 | 2/1987 | Mastran | 364/518 |
| 4,746,994 | 5/1988 | Ettlinger | 360/13 |
| 4,757,540 | 7/1988 | Davis | 395/2.87 |
| 4,868,687 | 9/1989 | Penn et al. | 360/13 |
| 4,945,566 | 7/1990 | Mergel et al. | 381/41 |
| 4,956,806 | 9/1990 | Crowe et al. | 395/146 |
| 4,974,178 | 11/1990 | Izeki et al. | 360/14.1 |
| 5,121,470 | 6/1992 | Trautman | 395/140 |
| 5,151,998 | 9/1992 | Capps | 395/800 |
| 5,204,969 | 4/1993 | Capps et al. | 360/13 |
| 5,220,611 | 6/1993 | Nakamura et al. | 395/2.85 |
| 5,227,892 | 7/1993 | Lince | 360/13 |
| 5,249,289 | 9/1993 | Thamm et al. | 395/600 |
| 5,343,451 | 8/1994 | Iizuka | 360/13 |
| 5,355,450 | 10/1994 | Garmon et al. | 395/162 |
| 5,388,197 | 2/1995 | Rayner | 395/154 |

FOREIGN PATENT DOCUMENTS

| | | |
|---|---|---|
| 0322100 | 6/1989 | European Pat. Off. |
| 0390048 | 3/1990 | European Pat. Off. |
| 0526064 | 3/1993 | European Pat. Off. |
| 2235815 | 3/1991 | United Kingdom. |
| 2245745 | 8/1992 | United Kingdom. |
| WO88/02958 | 4/1988 | WIPO. |
| WO91/03053 | 7/1991 | WIPO. |

OTHER PUBLICATIONS

"Volume History Display For A Personal Computer Audio Editor", IBM Technical Disclosure Bulletin, vol. 30, No. 10, Mar. 1988, New York, pp. 355–356.

"Three–Level Audio Object Display For A Personal Computer Audio Editor", IBM Technical Disclosure Bulletin, vol. 30, No. 10, Mar. 1988, New York, pp. 351–353.

Terry et al., "Managing Stored Voice in the Etherphone System".

Ades et al., Brochure from Proceedgins Avids '86 Conferenence entitled: "Voice Annotation and Editing in a Workstation Environment" pp. 13–28, (1986).

Swinehart et al., "An Experimental Environment for Voice System Development", pp. 1–10.

Krieg, P., "Multimedia–Computer und die Zukunft des Film/ Videoschnitts", Fernseh Und Kino–Technik, 45 Jahrgana–Nr. 5 pp. 252–254, (1991).

*SoundEdit Pro User Guide*, Macromedia, Inc., 1991, pp. 1, 7, 10–14, 20, 21, 79–93, 106, 107, 116–125, 130, 131, 168.

*Primary Examiner*—Heather R. Herndon
*Assistant Examiner*—Joseph R. Burwell
*Attorney, Agent, or Firm*—Wolf, Greenfield & Sacks, P.C.

[57] ABSTRACT

A display system represents an audio track as a discrete waveform, wherein each sample in the waveform may take on one of a discrete range of possible values. The discrete waveform indicates the presence of sound energy above user-set thresholds. Audio data samples are smoothed and applied to one or more thresholding functions. The resulting discrete output is displayed by using graphics of either different size or different color. An editor using this display system in conjunction with a computerized editing system receives an indication of where sufficient sound levels occur on the audio track. This information may be used to locate breaks in sound, dialog and other sound effects, which simplifies audio editing and synchronization of audio with other media in a multimedia presentation. Similar thresholds may be applied to the results of frequency analysis to provide an indication of which frequencies are present in the audio's signal.

17 Claims, 5 Drawing Sheets

APPARATUS AND METHOD FOR DISPLAYING AUDIO DATA AS A DISCRETE WAVEFORM

FIELD OF THE INVENTION

The present invention is related to computerized multimedia editing systems. More particularly, the invention is related to display systems which facilitate audio editing in computerized multimedia editing systems.

BACKGROUND OF THE INVENTION

A common problem in the production of a multimedia program is dialog and other sound editing. Audio tracks often are searched for desired words, sentences, or other sound effects, (often called "clips") and appropriate mark-in and mark-out points are selected. These "clips" must then be synchronized with video or other media with which they are associated in a multimedia program. In conventional, linear editing, relying on analog or digital source tape, an editor linearly searches (i.e., jogs) through the source tape until a word break is detected. This process is slow even for an experienced editor.

In computerized editing systems, such as a digital audio workstation available from Avid Technology, Inc. of Tewksbury, Mass. and a digital video workstation (e.g., Media Composer or Media Suite Pro, also available from Avid Technology, Inc.) the audio editing process has been made somewhat easier by providing a representation of the audio waveform for the audio track being edited.

Other available digital audio workstations include: the DSE-7000, from AKG Acoustics, Inc. of San Leandro, Calif.; the DDR-10 from Otari Corp. of Tokyo, Japan; the Audio File Plus, from AMC Industries, PLC of Bernley, Great Britain; Dyaxis from Studer Editech of Menlo Park, Calif.; and Waveframe 401 from Waveframe, Inc., of Sherman Oaks, Calif.

Other available digital video workstations which allow for audio editing include: Video F/X Plus from Digital F/X of Mountain View, Calif.; Studio from Matrox of Dorval, Quebec, Canada; Premier 2.0 from Adobe Systems, Inc., of Mountain View, Calif.; EMC2 from Edit Machines Corporation of Washington, D.C.; Lightworks from OLE Partners, LTD., of London, England; and Picture Processor System III from Montage Group, Ltd., of New York, N.Y.

An audio waveform can be an amplitude or an energy (absolute value of the amplitude) plot. Unfortunately, a fair amount of experience is still needed to interpret these waveforms in order to take full advantage of their utility.

SUMMARY OF THE INVENTION

To facilitate editing a display system was developed which represents an audio track as a discrete waveform (i.e. each sample in the waveform may take on one of a discrete range of possible values) indicating the presence of sound energy above user-set thresholds. The audio data is smoothed and applied to one or more thresholding functions. The resulting discrete output is displayed, giving the editor an indication of where sufficient sound levels occur on the audio track.

Frequency analysis is also provided in one embodiment to allow detection of specific signals, rhythms and the like.

DETAILED DESCRIPTION

The invention will be more completely understood through a reading of the detailed description which follows, when taken in conjunction with the attached drawing.

Figure 1:
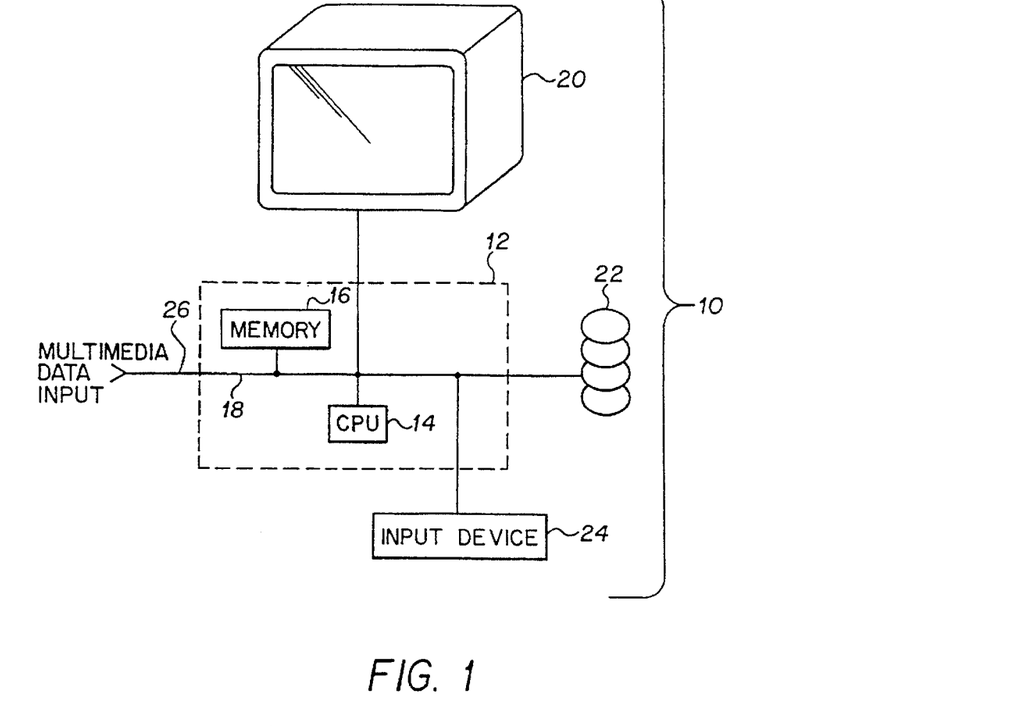
FIG. 1 is a block diagram of a computer system suitable for implementing a display system in accordance with the present invention.

FIG. 1 illustrates a suitable data processing system 10 with which the present invention may be implemented. The data processing system 10 is a typical programmable digital computer, such as the Macintosh family of computers available from Apple Computer of Cupertino, Calif. (preferably model Quadra 950), a workstation available from Silicon Graphics, Inc., of Mountain View, Calif. (preferably the Indigo model computer). It should be understood that many other data processing systems could be used to implement the present invention and that those specified are intended to be merely exemplary and illustrative. Such a data processing system may be programmed using typical computer programming languages, such as C++ (on the Indigo) or ThinkC 5.0 (on the Macintosh), which may then be compiled into object code, readable by the data processing system 10, using a suitable compiler, as those familiar with this art would understand.

A suitable data processing system 10 includes a main unit 12 which includes a central processing unit (CPU) 14 which controls the operation of the computer and performs arithmetic and logical operations. The data processing system also includes a random access memory 16, (in which the data is volatile) connected to the CPU via a bus 18. The bus 18 also connects the CPU 14 to a display 20, such as a cathode ray tube (CRT) display or a liquid crystal display (LCD). The data processing system 10 also includes a nonvolatile memory 22, such as a hard disk, or floppy disk drive. This disk drive is also connected to the CPU via bus 18. An input device 24, such as a keyboard, mouse, track ball, graphic tablet or other mechanical user interface, enables a user of the system to input information into the computer. The input device is connected to the CPU and memory via bus 18. The data processing system 10 also has an input port 26 which enables various multimedia data to be input directly into the computer system. Such an input usually includes, or may be connected to, an analog-to-digital converter (not shown) and other hardware subsystems which enable data such as video data and audio data to be directly input to the computer, sampled, and stored in memory 16 or disk 22.

The data processing system 10 may be programmed, for example, by using the computer languages described above, along with other computer languages, to enable audio editing. Many such systems are currently available. The present invention provides a display system which facilitates such audio editing by representing the audio data to be edited as a binary waveform having user-selectable parameters.

Figure 2:
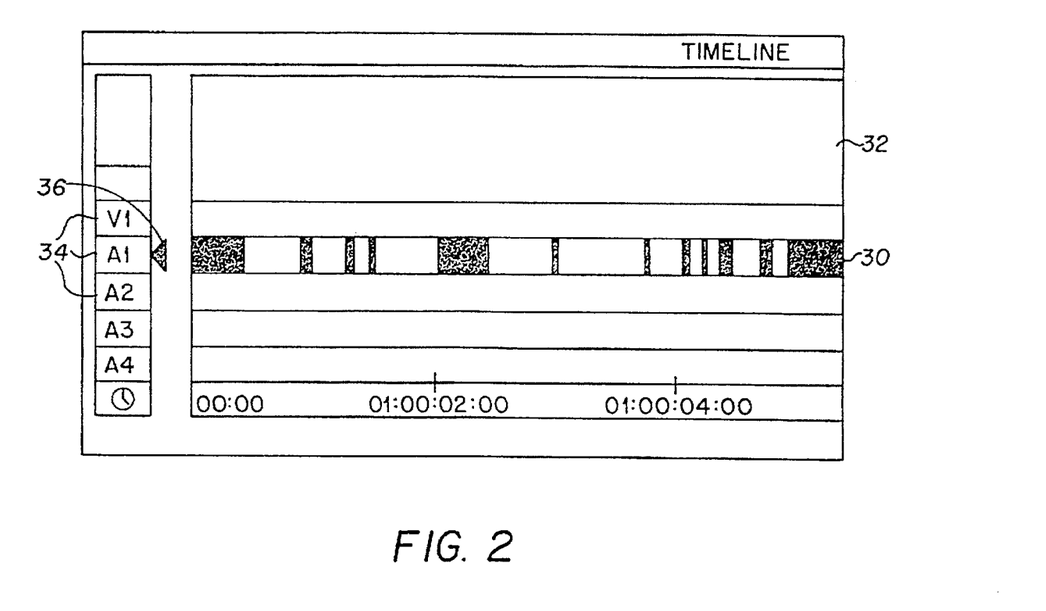
FIG. 2 illustrates sample graphics suitable for a display in system in accordance with an embodiment of the present invention.

Referring now to FIG. 2, suitable graphics for such a display system are shown. Audio data is represented as a strip, or a track, 30. A plurality of tracks can be displayed as desired, along with video or other multimedia data (indicated at 32). Buttons 34 enable a user to select a track 30 for editing. The provision of such buttons is familiar display and user interface technique in the art. A user may select such buttons and perform other editing functions using an input device which controls a cursor 36 on the display. Such cursor control devices include the track ball, mouse, or graphics tablet as described above.

Figure 3:
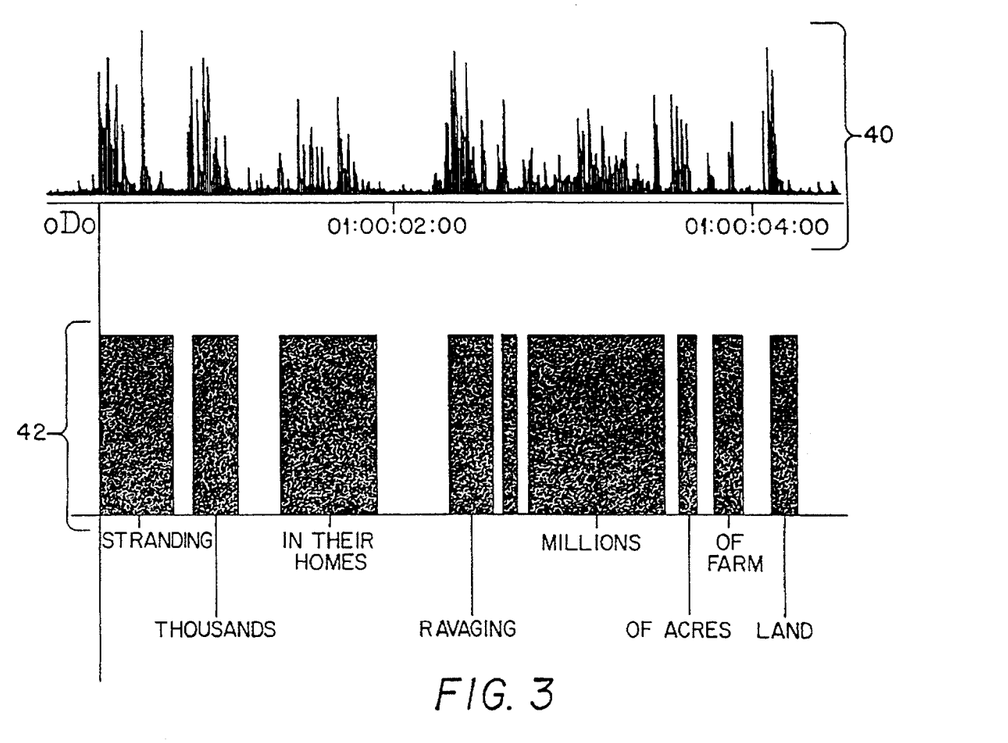
FIG. 3 is a sample energy plot of the prior art compared to a binary waveform as may be displayed in accordance with the present invention.

Each strip or track 32 represents a selected duration of time from the audio track. The amount of time is typically user-selectable, and is selected on the basis of the resolution to which accuracy in editing is desired by the editor using the system. In the example shown in FIG. 2, five seconds of samples from an audio track are displayed. The audio data for a track is mapped to the display space provided. That is, if the number of samples for the selected time period is greater than the number of pixels available to display the track, the data samples are averaged so as to provide one data sample per pixel in the strip 32. In previous computerized audio editing systems, these averaged samples were typically displayed to provide an audio waveform display, having amplitudes scaled to fit the vertical limits of the corresponding display strip 32. A sample corresponding waveform is shown in FIG. 3 at 40. In accordance with one aspect of the present invention, such a waveform may be converted into a binary waveform, such as shown at 42 in FIG. 3. How the binary values are generated will now be described in connection with the graph of FIG. 4.

Figure 4:
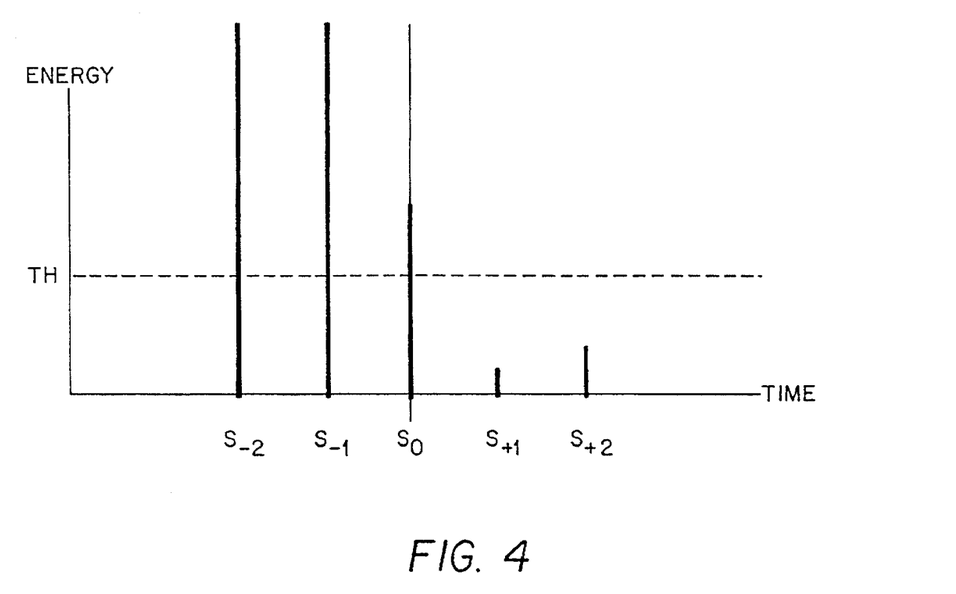
FIG. 4 is a graph illustrating how a thresholding function may be applied over a window of audio samples.

FIG. 4 is a graph of representing five samples $S_{-2}$ through $S_{+2}$ having a corresponding amplitude or energy of data samples taken in a given period of time. For each sample $S_0$ in the audio data displayed, the absolute values or squared values of surrounding data samples $S_{-N}$ through $S_{+N}$ are summed. This sum, or average or root-average based on this sum, is then compared to a threshold which is user-selectable. Preferably, the root-mean-square of the audio data is used for increased accuracy. The threshold is taken from a range of values corresponding to the range of possible values subjected to the threshold operation. In this embodiment, the amplitude of the audio signal is represented by a signed 16-bit number. The possible threshold value therefore ranges between 0 and 32,000. It was experimentally determined that a suitable default threshold is 10,500. This default can then be adjusted by the user for a given audio track so that the resulting output corresponds to sounds heard while listening to the audio track.

A threshold may be provided globally, for all tracks, and clips within tracks, displayed. However, the same threshold may not always be applicable to all clips within a track because different audio sources with different levels are often edited together. Alternatively, a threshold can be made an attribute of a track, or of a clip within a track, to provide more flexibility. In a computer system where tracks and clips are represented as objects such a modification may be readily made. A threshold can also be associated with a master clip, i.e., source data, having the advantage of storing the threshold with the sound data to which it is applied, allowing for a more accurate determination of an appropriate threshold. Threshold adjustment therefore becomes a function on the media database and is not an attribute of the display.

Background noise levels and signal-to-noise ratios can also be computed. Auto-correlation and similar techniques can be used to separate the desired audio signal from unwanted noise. Once the background noise has been characterized and measured, the signal-to-noise ratio (S/N) can be computed. A threshold can be determined from this S/N ratio.

Figure 5:
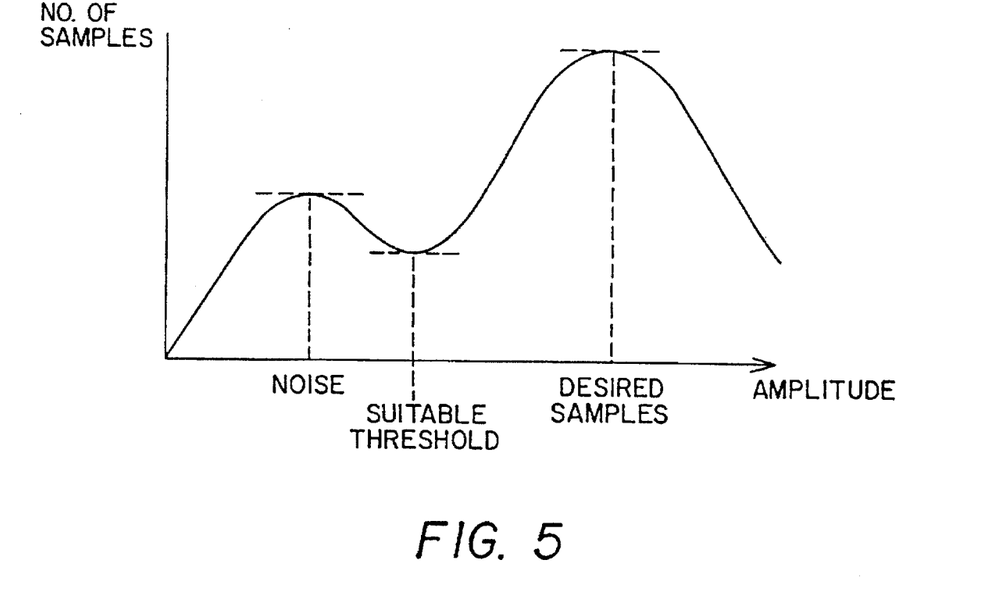
FIG. 5 is a graph illustrating a typical result from sorting audio samples with respect to amplitude.

A threshold for a track or a clip may also be calculated based on the history of data samples for the track or the clip, allowing adaptation to transient shifts in background noise levels. To do this, the sample values can be sorted by amplitudes. The resulting function of amplitude to number of samples tends to have two local maxima-one indicating a noise level, the other indicating a desired sound level. See FIG. 5. The local minimum between these two levels may be used as an appropriate threshold. A steady state room tone recording could be used as a source of expected background noise levels to improve the accuracy of such calculations. That is, steady state room tone samples may be added to the sorted audio samples, thus increasing the number of samples at the noise level.

The example shown in FIG. 4 is a five sample window (N=2) into the sound track. The number of samples which are summed per displayed sample (i.e., the size of the sample window) should be odd, so that the sample window is centered over the current sample $S_0$. A sample window is provided so that sporadic samples do not cause the binary waveform to change states too quickly. Rather, several samples in sequence must be either low or high in order to change the state of the binary waveform thereby providing some state momentum. The number of samples considered may also be made user-selectable, allowing the user to control the level of state momentum in the averaging process. There is a slight delay introduced by this method which causes the binary waveform to change states a number of time units after the actual energy waveform changes. In general, this delay is not a problem, since there are tens of thousands of samples per second and the delay is correspondingly negligible. It has been found that a sample window of five samples provides a suitable smoothing filter for this purpose. A three sample window was found to be insufficient, particularly at higher time resolutions. The sample window should not be made too wide as it would tend to distort the waveform of the audio data.

Figure 6:
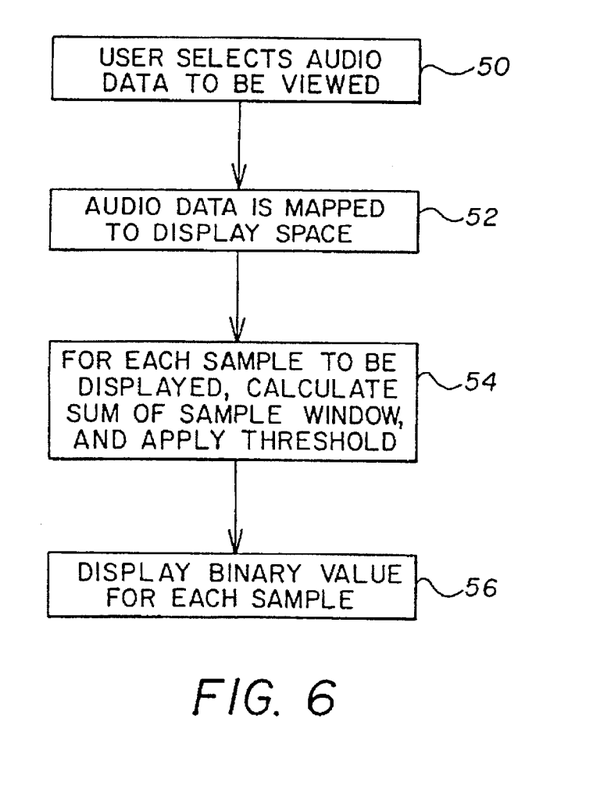
FIG. 6 is a flow chart describing how the display of FIG. 2 can be generated in accordance with the present invention.

FIG. 6 is a flow chart describing how this display is generated when a user selects a given audio track. The user first selects the audio data to be viewed in step 50. This audio data is usually available on the computer as an array of time-indexed 16-bit floating point words, wherein each word represents an instantaneous measurement of sound energy, sampled at 44.1 KHz. The data may also be 16-bit integers which enable faster computation. Audio data may be received at a number of different sampling rates; the sampling rate of 44.1 KHz is typical for a compact disc audio data. Such sound information is typically received through a microphone which provides an analog signal. The analog signal is converted to a digital signal using an analog-to-digital converter, as it is well known in the art, which provides a word of digital data at a given sampling rate. This data can be stored in a variety of different media, such as a floppy disk, hard disk or digital audio tape as time-indexed information.

The selected audio data is mapped to the display space in step 52, as described above using procedures which are well known in the art. For example, a number of audio data samples can be averaged to provide a corresponding sample to be displayed for each pixel in the display space. As described in connection with FIG. 4, for each sample to be displayed for a pixel in the display space, the sum of samples within a sample window is calculated and a threshold is applied in step 54 to obtain a binary value. Representation of this binary value is then displayed (step 56).

When the data is filtered, and the resulting binary waveform is displayed, the location of word breaks, or other breaks, in the sound on the audio track can be readily determined simply by viewing the display. For example, as shown in FIG. 3, where the binary waveform is zero, the person speaking the indicated sentence is pausing between words. Using such a display for editing enables an editor to readily mark cut locations (mark-in and mark-out locations) in the audio track. How cuts are marked in such computerized multimedia editing systems involves techniques which are well-known in the art. In video editing systems, although editing granularity is at the video frame level, fairly accurate edits can be made on word break boundaries using this display mechanism.

Because the number of data samples displayed depends on the size of the window and the time resolution selected by the user, the granularity of the binary waveform also changes, so that it does not always indicate word breaks. At much higher resolutions, it has been found that syllables of words can be detected. At lower resolutions, breaks between sentences are detected, while word breaks are not. Such functionality is useful for editing because it allows high level selections to be made easily, then later, more fine level editing can be performed.

Given a binary waveform which indicates the presence of word or any sound breaks in a sound track, new editing controls may also be provided. Some of these functions include going to a next word, going to the end of a word, selecting certain words, playing a word or a selection of words, or marking the start or end of a word as a cut location in the track. Such a display system may also be used for musical audio data. Given an appropriate threshold level, the binary waveform may be used to isolate volume peaks and crescendos in music. These and similar functions allow an editor to create multimedia programs based on the dialog or musical content of a sound track.

Figure 9:
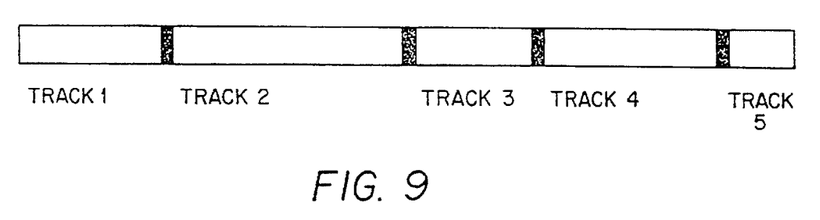
FIG. 9 shows a sample waveform used to identify sound effects on a Foley track.

Binary waveforms may also be used to identify and locate the presence of a sound effect on a Foley track (for example, see FIG. 9) especially if the track includes large amounts of silence, greatly improving the ability to synchronize the sound effect with visual material. Sound effects may be quickly found, edited, and synchronized with other material. In stereo sound, synchronization may be repaired if lost when one track slips versus another.

Figure 8:
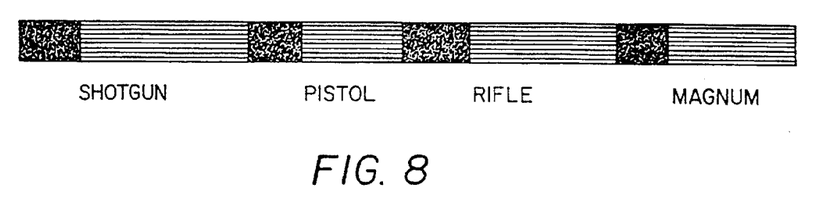
FIG. 8 shows a sample waveform used to identify the location of music tracks on a compact disk.

This type of display may also be used to detect long pauses, which may be then used to identify and separate effects or music tracks captured from prerecorded sources such as records, tapes, compact discs and the like. (For example, see FIG. 8).

By using such a display system an editor may readily visualize sound pieces, and the editing process is accelerated and simplified. Sentences, phrases, words, syllables, transient noises, speech patterns, and even silence such as dramatic pauses and sentence and phrase breaks, may be quickly located and isolated in a long audio track and extracted for appropriate use. Thus, less experience is required to generate high quality multimedia productions. Such a display system facilitates the development of marketing and advertising multimedia programs by companies who have no personnel with experience in film editing.

The invention is not limited to generating merely a binary waveform, nor to amplitude data. Two or more thresholds may also be provided to provide a discrete waveform, having a smaller range than a continuous waveform, but a broader range than a simple binary waveform. Two thresholds provide a hysteresis type state behavior to the display. For more thresholds, discrete color values may be used to identify levels of sound over different thresholds. For example, black may be used to indicate silence, purple for low volume, blue for mid-volume and green for high volume. A 16-bit continuous range of colors can completely represent a range of amplitudes from 0 to 32,000 represented by the sound data.

Figure 7:
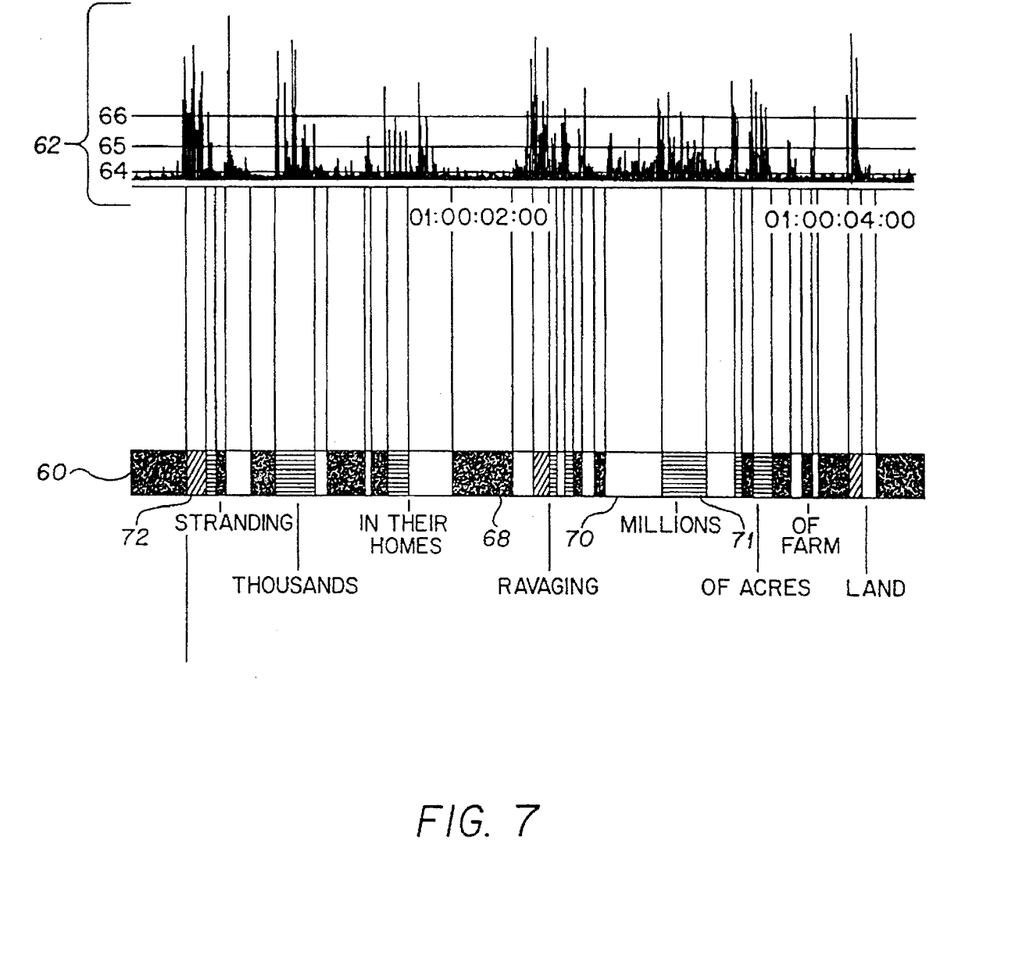
FIG. 7 is a sample energy plot of the prior art compared to a discrete waveform as may be displayed in accordance with the present invention.

A sample of a display using three thresholds, with threshold level colors identified by patterns, is shown in FIG. 7. In this figure, a discrete waveform is shown at 60, with a corresponding energy plot at 62. The threshold levels are indicated at 64, 65 and 66. When the sound energy is below the first threshold 64, the waveform takes on one value, indicated by black in FIG. 7 at, for example, 68. When sound energy is above the first threshold 64 but below the second threshold 68, the waveform takes a second value, indicated by white in FIG. 7 at, for example, 70. Similarly, the waveform takes on a third value when the sound energy is between the second and third thresholds, as indicated by horizontal lines, for example, at 71. Otherwise the waveform takes on a fourth value indicated by diagonal lines, for example, at 72.

Figure 10:
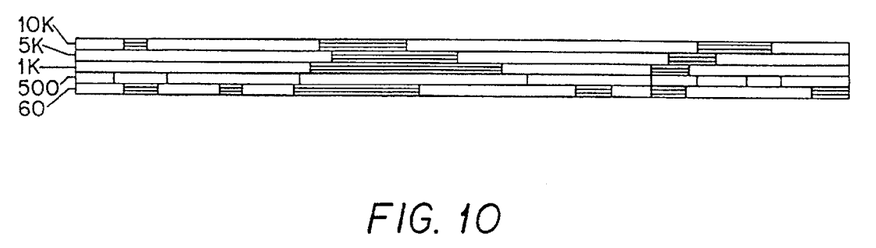
FIG. 10 shows a sample waveform used for frequency analysis.

Frequency data may also be used for this display system. Such frequency data can be obtained by applying a simple fast Fourier transform (FFT) with a limited frequency band to the audio data. A threshold can be applied to the amplitudes of the different frequency bands to determine if sounds within the certain frequency band are present. Such information may then also be displayed. A sample display is shown in FIG. 10.

Figure 11:
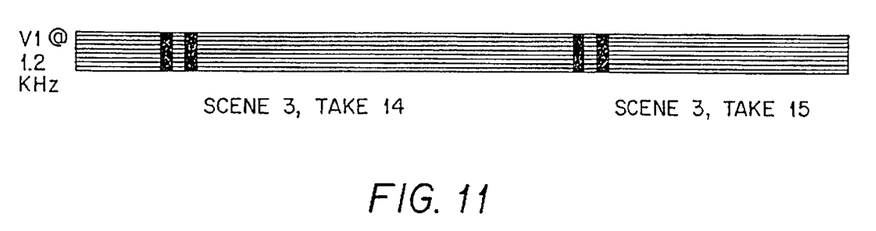
FIG. 11 shows a sample waveform used to identify the location of electronic slate beeps on a track.

Using frequency analysis, certain sounds can be detected, such as electronic slate beeps (signals used to separate one tape or scene from another during video and audio recording sessions) (for example, see FIG. 11). If the frequency of the desired signal is known (in this example the presumption is 1.2 KHz), its occurrence in a track can be identified, such as shown in black in FIG. 11.

It is also possible to show selected frequencies or a range of frequencies, using colors to denote the various frequency bands. Such frequency data allows certain aspects of music to be viewed, including beat detection. In some compositions with strong drum or other rhythm sounds, it is possible to isolate or determine the tempo of the music using such frequency data.

Frequency data may also be used to identify potential problem areas in a sound track. For example, repetitive background noise events, such as fans, light buzzing, etc. may be detected. Using both frequency and amplitude data, it is possible to avoid the loss of dialogue in noisy environments, when dialogue levels fall below the levels of background noise. It is then possible to differentiate further word breaks in this low level dialogue.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. An apparatus for facilitating computerized editing of audio data, the apparatus comprising:

means for selecting a portion of the audio data;

means for applying a smoothing operation to the selected portion of the audio data to obtain an average value for each sample;

means for comparing the average value for each sample to a threshold value to generate a discrete waveform representative of the selected portion of the audio data; and means for displaying the discrete waveform on a video display as a plurality of bars of substantially equal height, each of the plurality of bars having a color selected according to a value of a corresponding sample of the audio data.

2. The apparatus of claim 1 wherein the means for comparing includes means for performing a root-mean-square operation on the plurality of samples.

3. The apparatus of claim 1, further comprising:

means for receiving input from a user indicative of a selected threshold value;

wherein the means for comparing includes means for comparing each of the average values to the selected threshold value.

4. The apparatus of claim 3 wherein the threshold value is adjustable by the user.

5. The apparatus of claim 1, further comprising:

means for computing a signal-to-noise ratio of the selected portion of the audio data; and means for determining the threshold value from the computed signal-to-noise ratio.

6. The apparatus of claim 1, further comprising means for determining the threshold value based upon the selected portion of the audio data.

7. The apparatus of claim 6 wherein the means for determining includes means for sorting sample values by amplitudes, resulting in a function with a local minimum between a noise level and a desired sound level, and means for selecting the local minimum as the threshold value.

8. The apparatus of claim 6 further comprising means for adding a series of samples that represent a steady state room audio tone to the history of samples from the selected portion of the audio data, thereby increasing the number of samples at the noise level.

9. An apparatus for facilitating computerized editing of a Foley track containing sound effects, the apparatus comprising:

means for translating data from the Foley track to a sequence of digital audio data;

means for selecting a portion of the digital audio data to be viewed by an editor;

means for generating, from the selected portion of the digital audio data, a discrete waveform as a plurality of bars of substantially equal height, each of the plurality of bars having a color selected according to a value of a corresponding sample of the audio data, wherein the discrete waveform indicates locations of significant sounds within the selected portion of the digital audio data and distinguishes such locations from locations without significant sounds, wherein a significant sound is a sound having particular audio characteristics;

means for displaying the generated discrete waveform on a video display, whereby a user may view locations of significant sounds in the selected portion of the digital audio data; and means, operative in response to an input from the editor, for locating a sound effect on the Foley track using the generated discrete waveform.

10. A method for facilitating computerized editing of audio data, the method comprising the steps of:

selecting a portion of the audio data;

applying a smoothing operation to the selected portion of the audio data to obtain an average value for each sample;

comparing the average value for each sample to a threshold value to generate a discrete waveform representative of the selected portion of the audio data; and displaying the discrete waveform on a video display as a plurality of bars of substantially equal height, each of the plurality of bars having a color selected according to a value of a corresponding sample of the audio data.

11. The method of claim 10 wherein the step of comparing includes determining a root-mean-square of each sample of audio data.

12. The method of claim 10, further comprising a step of receiving input from a user indicative of a selected threshold value, and wherein the step of comparing includes comparing each of the average values to the selected threshold value.

13. The method of claim 10, further comprising the steps of:

computing a signal-to-noise ratio of the audio data; and determining the threshold value from the computed signal-to-noise ratio.

14. The method of claim 10 further comprising the step of determining the threshold value based upon the selected portion of the audio data.

15. The method of claim 14 wherein the step of determining includes the steps of:

sorting sample values of the audio data by amplitudes, resulting in a function with a local minimum between a noise level and a desired sound level; and selecting the local minimum as the threshold value.

16. The method of claim 14 further comprising the step of adding a series of samples of the audio data that represent a steady state room audio tone to the samples of the audio data, thereby increasing the number of samples at the noise level.

17. A method for facilitating computerized editing of a Foley track containing sound effects, the method comprising the steps of:

translating data from the Foley track to a sequence of digital audio data;

selecting a portion of the digital audio data to be viewed by an editor;

generating, from the selected portion of the digital audio data, a discrete waveform as a plurality of bars of substantially equal height, each of the plurality of bars having a color selected according to a value of a corresponding sample of the audio data, wherein the discrete waveform indicates locations of significant sounds within the selected portion of the digital audio data and distinguishes such locations from locations without significant sounds, wherein a significant sound is a sound having particular audio characteristics;

displaying the generated discrete waveform on a video display, whereby a user may view locations of significant sounds in the selected portion of the digital audio data; and locating, in response to an input from the editor, a sound effect on the Foley track using the generated discrete waveform.

* * * * *